United States Patent [19]
Resh

[11] Patent Number: 4,746,780
[45] Date of Patent: May 24, 1988

[54] ONE-SCREW MOUNTING SYSTEM FOR GANGED COMPONENTS

[75] Inventor: John Resh, Valparaiso, Ind.

[73] Assignee: McGill Manufacturing Company, Inc., Valparaiso, Ind.

[21] Appl. No.: 91,720

[22] Filed: Sep. 1, 1987

[51] Int. Cl.$^4$ .............................................. H01H 9/08
[52] U.S. Cl. .................................... 200/294; 200/307; 248/300; 361/427
[58] Field of Search ............... 200/294, 295, 307, 296; 361/427, 429; 248/300; 220/3.9, 3.92

[56] References Cited

U.S. PATENT DOCUMENTS 3,518,391 6/1970 Hipple ............................ 200/307 X
4,270,035 5/1981 Richter, Sr. ........................ 200/294

FOREIGN PATENT DOCUMENTS 2510414 9/1976 Fed. Rep. of Germany ...... 361/427

Primary Examiner—Renee S. Luebke
Attorney, Agent, or Firm—Leydig, Voit & Mayer

[57] ABSTRACT

Inner and outer electrical switches are attached in ganged face-to-face relation to a mounting plate by a screw which extends through two upper alined holes of the switches, by a pin which projects from the plate and into a lower hole of the inner switch, and by an L-shaped locking element having one leg extending through a lower hole of the outer switch and into the lower hole of the inner switch. The other leg of the L-shaped locking element is torsionally loaded and is adapted to be clamped between the head of the screw and the outer side of the outer switch.

11 Claims, 1 Drawing Sheet

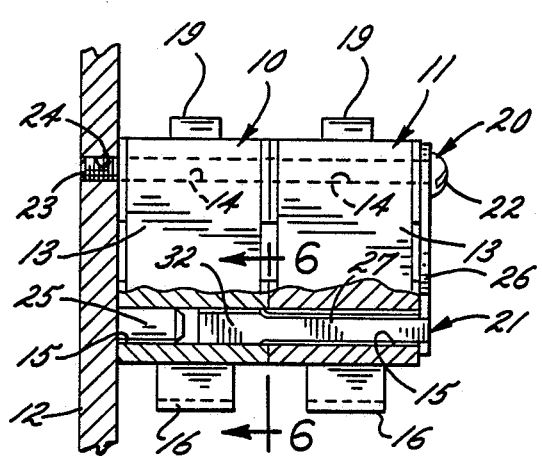
FIG. 1
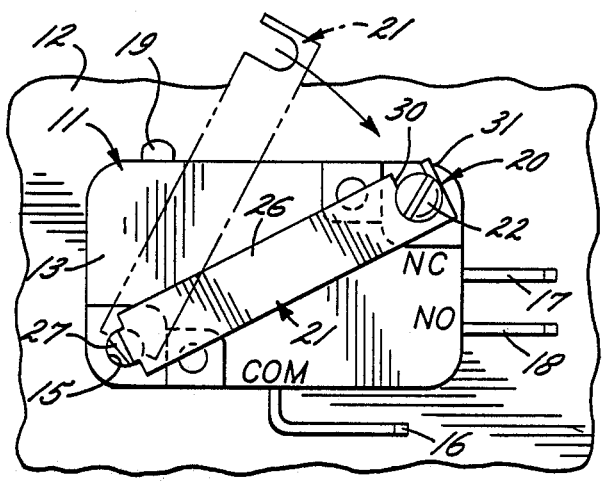
FIG. 2
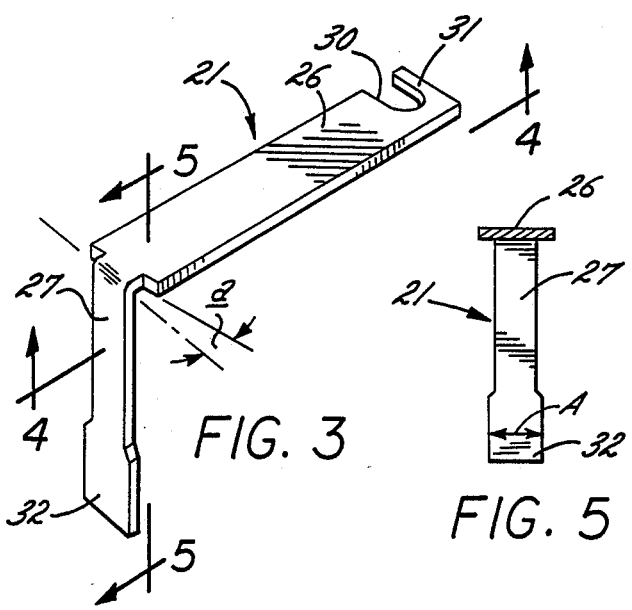
FIG. 3
FIG. 5
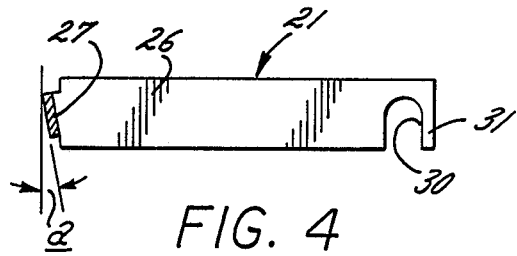
FIG. 4
FIG. 6
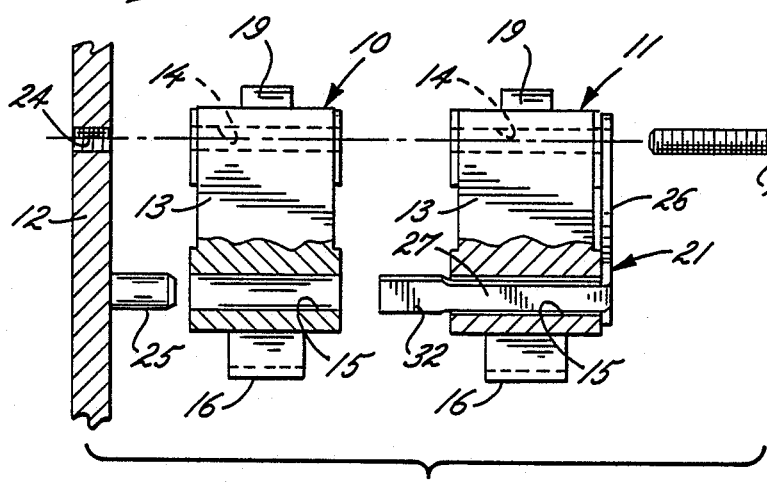
FIG. 7
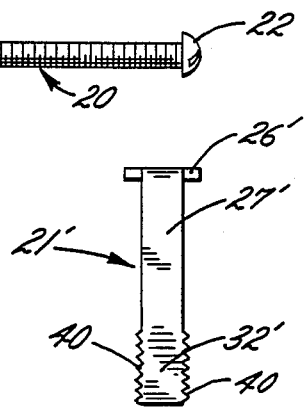
FIG. 8

ONE-SCREW MOUNTING SYSTEM FOR GANGED COMPONENTS

BACKGROUND OF THE IVNENTION

This invention relates to the mounting of components and, more particularly, to the mounting of components in the form of electrical switches of the type used in industrial equipment.

It is conventional to mount two or more electrical switches in face-to-face ganged relation on a mounting member such as a flat plate. Each switch typically includes two diametrically spaced mounting holes adapted to receive screws for attaching the switches to the plate.

SUMMARY OF THE INVNETION

The general aim of the present invention is to reduce the assembly time required to attach two or more ganged components to a mounting member and to enable quicker and easier replacement of one of the components in the event that component fails.

Another object of the invention is to achieve the foregoing by attaching the components to the mounting member by the use of a single screw and by the use of a unique slip-in locking element which coacts with the screw to keep the components securely anchored.

The invention also resides in the novel construction of the locking element enabling the locking element to be loaded torsionally into engagement with the shank of the mounting screw so as to hold the components together during shipment and/or final assembly.

These and other objects and advantages of the invention will become more apparent from the following detailed description when taken in conjunction with the accompanying drawings.

BRIEF DESCRIPTION OF THE DRAWINGS

FIG. 1 is a side elevational view showing a pair of ganged components attached to a mounting member in accordance with the unique principles of the present invention, certain parts being broken away and shown in section.

FIG. 2 is a fragmentary front elevational view of the parts shown in FIG. 1.

FIG. 3 is a perspective view of one embodiment of a new and improved locking element incorporating the unique features of the invention.

FIGS. 4 and 5 are cross-sections taken substantially along the lines 4—4 and 5—5, respectively, of FIG. 3.

FIG. 6 is an enlarged fragmentary cross-section taken substantially along the line 6—6 of FIG. 1.

FIG. 7 is an exploded perspective view of the mounting member, the components, the mounting screw and the locking element.

FIG. 8 is a view similar to FIG. 5 but shows a modified version of a locking element.

DETAILED DESCRIPTION OF THE PREFERRED EMBODIMENTS

For purposes of illustration, the present invention has been shown in the drawings in conjunction with a pair of components 10 and 11 adapted to be attached releasably to the outer side of a mounting member 12 which herein has been shown as being a flat plate. In the present instance, the two components 10 and 11 are identical to one another and comprise single pole, double throw snap action electrical switches of the type sold as Part No. 4775 by McGill Manufacturing Company, Inc., the assignee of the present invention.

Briefly, each of the switches 10, 11 comprises a block-like plastic housing 13 formed with horizontally extending and diagonally spaced mounting holes 14 and 15. Supported by the housing are a common electrical terminal 16, a normally closed terminal 17, and a normally open terminal 18. When a spring-loaded actuator 19 is depressed, an electrical circuit across the common terminal and the normally closed terminal is interrupted and, at the same time, a circuit is established across the common terminal and the normally open terminal.

In accordance with the present invention, the ganged switches 10 and 11 are adapted to be attached quickly and easily to the mounting plate 12 by a single mounting screw 20 and by a novel locking or fastening element 21 which coacts with the screw to hold the switches in ganged relation on the mounting plate. As will become more apparent subsequently, the fastening element enables the switches and the screw to be shipped in preassembled relation and permits fast replacement of a switch if the switch should happen to fail.

More specifically, the screw 20 is a standard machine screw having a slotted head 22 and a threaded shank 23. The shank is adapted to extend through the upper holes 14 of the switches 10 and 11 and is adapted to be threaded into a tapped hole 24 (FIG. 7) in the mounting plate 12.

Pursuant to the invention, the inner switch 10 is also attached to the mounting plate 12 by a projection 25 while the outer switch 11 is secured to the inner switch by the fastening element 21. Herein, the projection 25 is simply a cylindrical pin which is rigid with and projects outwardly from the mounting plate 12. When the inner switch 10 is mounted, the pin 25 is received in the lower hole 15 of the inner switch and prevents that switch from rotating about the axis of the screw 20.

The fastening element 21 is shown most clearly in FIG. 3 and herein comprises a generally L-shaped member made of resiliently yieldable material such as brass The fastening element 21 includes two legs 26 and 27 which extend generally perpendicular to one another in one plane and which preferably are inclined relative to one another in a transverse plane at an angle a of about ten degrees as shown in FIGS. 3 and 4. A generally U-shaped notch 30 is formed in the free end portion of the leg 26 and defines a hook 31 while a comparatively wide tab 32 with a transverse dimension A (FIG. 5) is formed at the free end portion of the leg 27.

The lower hole 15 in the outer switch 11 is constructed in a novel manner enabling the tab 32 of the leg 27 of the fastening element 21 to be locked angularly in the hole. As shown in FIG. 6, the hole 15 is non-circular in shape and its longer transverse dimension B is slightly greater than the transverse dimension A of the tab. The smaller transverse dimension C of the hole, however, is smaller than the transverse dimension A of the tab. As a result, the tab 32 may be inserted into the hole 15 when the tab is oriented angularly as shown in phantom lines in FIG. 6. After the tab has been turned through approximately sixty degrees from its phantom line position, its side edges engage the wall of the hole 15 and prevent further turning of the tab.

With the foregoing arrangement, the two switches 10 and 11 may be attached to the mounting plate 12 simply by placing the switches in face-to-face relation, by slipping the shank 23 of the screw 20 through the upper holes 14 in the two switches, and by positioning the switches such that the pin 25 projects into the lower hole 15 of the inner switch 10 to prevent that switch from turning about the axis of the screw. Thereafter, the leg 27 of the fastening element 21 is inserted inwardly through the lower hole 15 in the outer switch 11 to cause the tab 32 to enter the lower hole 15 in the inner switch 10. The fastening element 21 then is turned in a clockwise direction to cause the tab 32 to engage and stop against the wall of the lower hole 15 (see FIG. 6). With further clockwise turning of the leg 26 of the fastening element 21 from the position shown in phantom lines in FIG. 2, the leg 27 is torsionally loaded and exerts a counterclockwise restoring torque on, the leg 26. Clockwise turning of the leg 26 as viewed in FIG. 2 against the restoring torque is continued until the free end portion of the leg 26 has moved clockwise past the outer side of the head 22 of the screw 20. Thereafter, the leg 26 is pushed inwardly and is released so as to enable the restoring torque to turn the leg 26 counterclockwise and cause the edges of the notch 30 to swing into hooking relation with the shank 23 of the screw 20. With the free end portion of the leg 26 being torsionally biased against the shank 23, the screw 20 is tightened to clamp the free end portion of the leg 26 between the outer side of the switch 11 and the inner side of the screw head 22. When the leg 26 is so clamped, it acts through the leg 27, the tab 32, the inner switch 10 and the pin 25 to prevent the outer switch 11 from turning about the axis of the screw 20.

FIG. 8 shows a modified fastening element 21' in which the side edges of the tab 32' are serrated as indicated at 40. The serrated edges dig into the wall of the hole 15 to help prevent turning of the tab and to increase the resistance of the tab to longitudinal pull out.

From the foregoing, it will be apparent that the present invention brings to the art a new and improved arrangement by which two switches or other components 10 and 11 may be attached to and ganged on a mounting member 12 through the use of a single screw 20 and a simple slip-in fastening element 21. If only one switch is required, that switch may be attached to the mounting member 12 by use of a single screw and without the pin 25 projecting outwardly beyond the outer side of the switch. If more than two switches are to be ganged together, use may be made of a longer screw 20 and of a fastening element 21 having a longer leg 27.

Because the mounting of the switches 10 and 11 is effected by a single screw 20, the time required to initially mount the switches or to replace a failed switch is reduced significantly. Also, the switches 10 and 11, the screw 20 and the fastening element 21 may be shippped in preassembled relationship and quickly attached to the plate 12 simply by tightening the screw. When the parts are shipped in preassembled relation, the edges of the notch 30 engage the threads on the screw shank 23 and restrict the screw 20 against falling out of the holes 14.

I claim:

1. A combination of, first and second components, and means for fastening said components in ganged relation on a mounting member having a hole and having a projection spaced from said hole, each component having first and second holes capable of being alined with the first and second holes of the other component, said means comprising a screw sized to extend through the first holes of said components and to thread into the hole in said mounting member thereby to partially fasten said components to said mounting member, said projection extending into a portion of the second hole of said first component and preventing said first component from turning about the axis of said screw, a fastening element having a first leg extending through the second hole of said second component and into the second hole of said first component, and said fastening element having a second leg connected with and extending generally perpendicular to said first leg and adapted to be secured releasably to said second component whereby said fastening element cooperates with said first component and said projection to prevent said second component from turning about the axis of said screw.

2. The combination defined in claim 1 in which said components are electrical switches 3. The combination defined in claim 2 in which said switches are identical to one another.

4. The combination defined in claim 1 in which said fastening element is made of resiliently yieldable material, the second leg of said fastening element being restricted against bodily rotation about the axis of the second hole in said first component whereby said second leg of said fastening element may be torsionally loaded about the axes of said second holes.

5. The combination defined in claim 4 in which said screw comprises a head and a shank, said second leg of said fastening element having a free end portion located between said screw head and said second component and being hooked around and bearing resiliently against said screw shank.

6. The combination defined in claim 5 in which the free end portion of said second leg is formed with a generally U-shaped notch for receiving said screw shank.

7. A combination of, inner and outer components each having inner and outer sides and means for fastening said, components in ganged relation with one another on an outer side of a mounting member having a tapped hole and having an outwardly extending projection spaced from said hole, each component having spaced first and second holes extending between its inner and outer sides and adapted to be alined with the first and second holes of the other component, said means comprising a screw having a head located adjacent the outer side of said outer component and having a shank sized to extend through the first holes of said components and to thread into the tapped hole in said mounting member thereby to partially fasten said components to said mounting member, said projection extending into an inner portion of the second hole of said inner component and preventing said inner component from turning about the axis of said screw, a fastening element made of resiliently yieldable material and having first and second integral legs disposed substantially perpendicular to one another, the first leg of said fastening element extending inwardly through the second hole of said outer component and into an outer portion of the second hole of said inner component and being restricted against rotation about the axes of said second holes, said second leg extending along the outer side of said outer component and having a free end portion located between the outer side of said outer component and the head of said screw and hooked around the shank of said screw, and said second leg being torsionally loaded about the axes of said second holes and being urged resiliently against the shank of said screw whereby said fastening element cooperates with said screw, said first component and said projection to prevent said second component from turning about the axis of said screw.

8. The combination defined in claim 7 in which the second hole in said inner component is non-circular and has unequal perpendicular transverse dimensions, the second leg of said fastening element being non-circular and having a transverse dimension less than the larger transverse dimension of said second hole and greater than the smaller transverse dimension of said second hole whereby said second leg may be inserted into said second hole but is restricted from turning beyond a predetermined distance about the axis of the second hole.

9. The combination defined in claim 8 in which said second leg has an inner end portion formed with serrations adapted to lock against the wall of the second hole in said inner component.

10. The combination defined in claim 7 in which a generally U-shaped notch is formed in the free end portion of said second leg and is hooked around the shank of said screw.

11. The combination defined in claim 7 in which said components are identical electrical switches.

* * * * *